April 13, 1937.  R. L. GEIB  2,077,104
STAGE APPARATUS
Filed March 2, 1934
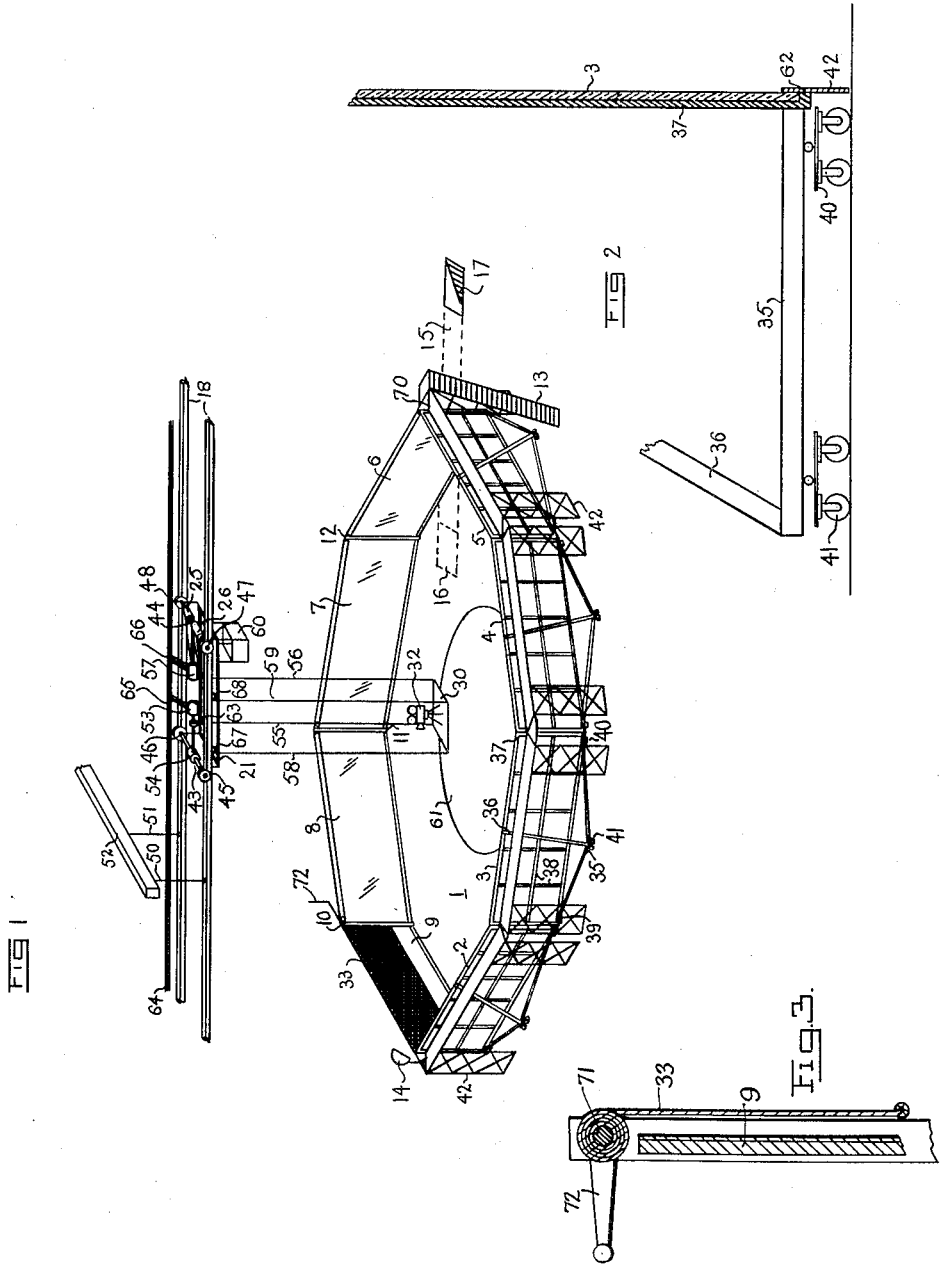
R.L.Geib.  INVENTOR.
BY W E Beatty
ATTORNEYS.

Patented Apr. 13, 1937

2,077,104

UNITED STATES PATENT OFFICE 2,077,104

STAGE APPARATUS

Robert Lewis Geib, Los Angeles, Calif., assignor to Warner Bros. Pictures, Inc., New York, N. Y., a corporation of Delaware Application March 2, 1934, Serial No. 713,712

2 Claims. (Cl. 88—16)

This invention relates to a new stage apparatus and has to do with the making of motion pictures.

An object of the invention is to obtain a tremendous production value within a comparatively restricted area. This is accomplished by providing a plurality of inwardly facing mirrors arranged about a stage, and a support for a motion picture camera outside of the reflected area of the mirrors.

Another object of the invention is to gain entrance and exit from the stage space enclosed by a plurality of inwardly facing mirrors without disturbing them. This is accomplished by providing a subterranean passageway, having one entrance within the enclosed space and another entrance without the enclosed space.

Another object of the invention is to make a "dolly or truck" shot of action that may take place within the space defined by the inwardly facing mirrors. This is accomplished by providing an annular track circumscribing the upper edges of the inwardly facing mirrors.

Another object is to photograph from a close-up of an action component to a long shot thereof while gradually increasing the field of view of the camera to include the multiple reflections of the action components in the various mirrors. This is accomplished by providing above the space enclosed by the mirrors an overhead trolley carrying a suspended elevator platform upon which a motion picture camera may be supported. A non-actinic roller curtain is provided for each of the inwardly facing mirrors, whereby the elevator platform and the curtains may be simultaneously raised or lowered with their respective base lines in a common horizontal plane.

For further details of the invention reference may be made to the drawing wherein:

Fig. 1 is a perspective view showing an arrangement of apparatus used to accomplish this invention.

Fig. 2 is a side elevation, partly in cross-section showing the mounting for one of the mirrors.

Fig. 3 is an end view of the mounting for one of the mirror curtains.

Referring now to Fig. 1, arranged about a stage 1 are a series of inwardly facing mirrors 2 to 9 inclusive. The mirrors may be placed to coincide at their adjacent edges or they may be conjoined by narrow ornamental pillars, such as 10, 11 and 12. It will be understood that mirrors 2 to 9 may be mounted either resiliently or rigidly, as may best suit the individual location.

The mounting of the mirror 3 will be now more particularly described. The mirrors 2 to 9 and the supporting arrangements thereof are exactly similar to the arrangement that will be described in connection with the mirror 3. The base of mirror 3 is shown to be supported by a triangular frame member 35. A brace arm 36 is supported at its lower end by the apex of triangular frame 35 and at its upper end by a mirror frame 37. The frame member 37 has suitable cross-arms 38 at the back of mirror 3 for rigidity. A bogie truck 39 is mounted at one end of the base of the frame 37 and a second bogie truck 40 is mounted at the opposite end thereof. A third bogie truck 41 is mounted at the apex of the triangular frame 35. As shown in Fig. 2 the mirror 3 rests on a projecting lip 62 of the frame member 37. A baseboard 42 is fastened to the lip 62 adjacent the bottom edge of the mirror 3 and substantially projects to the floor in order to form a cover for the bogie trucks 40 and 41. This arrangement provides a mobile frame for the mirror 3 and facilitates movement thereof into any position that may be desired.

As will be understood, a greater or lesser number of mirrors than illustrated may be used, depending upon the configuration of the area to be enclosed.

A segmental platform 70 is built adjacent the upper edges of the mirrors 2 to 9 forming a track there-around. Platform 70 is supported by a scaffolding 42 which may be permanent or temporary as is most convenient. The segments of the platform 70 are adapted to fit together and form a continuous path around the upper edge of any closed figure formed by the mirrors. Access to the platform 70 is had by means of a stairway 13. The platform 70 may be used to support a lamp or lamps, such as 14, in order to illuminate an action component, such as a group of dancers or the like (not shown) within the area enclosed by the mirrors. The platform 70 is built of such stability that a dolly carrying a camera (not shown) may be trucked there-around in order to photograph action upon the stage 1.

In order that the mirrors need not be disturbed to permit the entrance and exit of actors or others to the enclosed area, a tunnel 15 is provided beneath the mirror 6. Tunnel 15 has one entrance 16 suitably covered by a trap door (not shown) inside of the area defined by the mirrors and another entrance 17 outside of the area so defined.

A pair of inverted T rails 18 are mounted above the stage 1, outside of the field of view of mirrors 6 to 9. Rails 18 are supported by hanger bars, such as 50 and 51, depending from a ceiling beam 52. An underslung trolley 21 is adapted to traverse the rails 18. The trolley 21 is built of standard Cleveland Tramway equipment. The trolley 21 consists mainly of two axle members 43 and 44, each supporting two pairs of wheels 45, 46, 47 and 48 respectively in such a manner that one wheel of each pair rests on the inner arm and one wheel rests on the outer arm of its particular inverted T rail. The main body of the trolley 21 is supported underneath the rails 18 by means of suitable hanger brackets and bearings (not shown) in the usual manner. The axle 43 and through it the wheels 45 and 46 are driven by means of an electric motor 53 through a differential gear 54.

A clutch member 63 is placed in the drive between motor 53 and differential 54. The axle 44 rotatably supports two cable drums 25 and 26 suitably driven by means of a motor 57. Motors 53 and 57 are supported between the axles 43 and 44 by suitable cross struts (not shown) and are energized from an overhead power line 64, through conductors 65 and 66 respectively. Drum 25 is provided with depending cables 55 and 56 attached to and supporting the front end of a camera platform 30, through suitably positioned pulleys (not shown) mounted on the trolley 21. Drum 26 is provided with depending cables 58 and 59 attached to and supporting the rear end of the platform 30 through pulley members 67 and 68 mounted on trolley 21.

A motion picture camera 32 is supported by the platform 30. It is to be understood that horizontal movement of the trolley 21 and vertical movement of the platform 30 as controlled by the speed of rotation of the drums 25 and 26 may be variably synchronized so that any desired angular movement of the platform 30 relative to the stage 1 may be obtained.

A cage 60 depending from and suitably supported by the trolley 21 is used to house the controls (not shown) of the motors 53 and 57 so that an operator may sit therein and control movement of the trolley 21 and the platform 30 as desired.

A roller curtain 33 mounted on a roller 71 with a crank 72 and which is preferably of black velvet, is provided for the mirror 9 and is shown in Fig. 1 to be half-way drawn over the surface thereof. Similar curtains and mountings are provided for each of the other mirrors. These curtains, such as 33, may be suitably actuated either manually with crank 72 or otherwise, as will be well understood.

A revolving platform 61 is positioned in the center of the stage 1 upon which actors may perform during rotation thereof. Platform 61 may be driven by any desired means (not shown) to produce variable speeds of rotation, under the control of an operator remote therefrom.

In the operation of this device the camera 32 is supported directly in front of the mirror 9, at which time the curtain 33 will be completely lowered to cover the whole surface of the mirror. An actor or actors (not shown) will stand between the camera 32 and the curtain 33. The camera 32 will then be set in motion and a closeup photographed of the actor. Simultaneously with this photographing the trolley 21 will be moved along the rails 18 and the cables 55, 56, 58 and 59 wound up on the drums 25 and 26, thus obliquely traversing the camera out of the area enclosed by the mirrors. Simultaneously with the movement of the camera 32 the curtain 33 will be raised, care being taken to keep the base line thereof in the same horizontal plane with the base line of the platform 30, so that the photographing camera 32 will gradually record the increasing reflections of the action component in the various mirrors, without photographing its own reflection.

In another case the curtains covering each of the mirrors 2 to 9 may be lowered and a dolly shot taken from the platform 70 during which the curtains may be slowly raised in order to photograph action that takes place within the area defined by the mirrors, as well as the multiple reflections produced thereby.

In still another case the camera 32 may be suspended above the center of the stage 1, outside of the reflected area of the mirrors 2 to 9, and various angular shots photographed.

Thus it will be seen that by the use of this invention a vast number of unusual and pleasing scenes may be made in a small space and yet present to the eye of the camera the semblance of a tremendous production.

Having thus described the invention what is claimed as new and desired to secure by Letters Patent is:

1. Stage apparatus comprising a plurality of inwardly facing mirrors about a centrally located stage space, a camera, means for suspending said camera, said means being adapted to lower, raise and move said camera horizontally above said centrally located stage space and out of reflective range of said mirrors, a plurality of curtains, means for suspending a curtain in front of each of said mirrors, and means for removing said curtains from said mirrors as said camera is moved above the reflective range of said uncurtained mirrors to control the number of reflections as seen by said camera.

2. Stage apparatus comprising a polygonal array of inwardly facing mirrors, a rotatable stage enclosed thereby, means for suspending a camera at different heights above said stage, a plurality of curtains, means for suspending a curtain in front of each of said mirrors, and means for raising said curtains while raising said camera, whereby said camera is adapted to move and remain out of the line of reflections from said mirrors.

ROBERT LEWIS GEIB.